(12) United States Patent
Kim et al.

(10) Patent No.: US 11,475,234 B2
(45) Date of Patent: Oct. 18, 2022

(54) CLUSTER VISUALIZATION DEVICE

(71) Applicant: GWANGJU INSTITUTE OF SCIENCE AND TECHNOLOGY, Gwangju (KR)

(72) Inventors: Jong Won Kim, Gwangju (KR); Taek Ho Nam, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 429 days.

(21) Appl. No.: 16/629,299

(22) PCT Filed: Mar. 13, 2018

(86) PCT No.: PCT/KR2018/002945
§ 371 (c)(1),
(2) Date: Jan. 7, 2020

(87) PCT Pub. No.: WO2019/009497
PCT Pub. Date: Jan. 10, 2019

(65) Prior Publication Data
US 2020/0134359 A1    Apr. 30, 2020

(30) Foreign Application Priority Data
Jul. 7, 2017  (KR) .................. 10-2017-0086579

(51) Int. Cl.
*H04L 29/06* (2006.01)
*G06K 9/62* (2022.01)
(Continued)

(52) U.S. Cl.
CPC ....... *G06K 9/6219* (2013.01); *G06F 9/45558* (2013.01); *G06T 17/10* (2013.01);
(Continued)

(58) Field of Classification Search
CPC ........ G06F 2009/45595; G06F 16/287; G06F 16/26; G06F 2009/45591; G06F 9/451;
(Continued)

(56) References Cited

U.S. PATENT DOCUMENTS

2010/0110932 A1    6/2010  Leslie et al.
2016/0156508 A1*   6/2016  Kim .................. H04L 41/12
                                              709/220
(Continued)

FOREIGN PATENT DOCUMENTS

| KR | 1020120057066 A | 6/2012 |
| KR | 1020150139303 A | 12/2015 |
| WO | 2014201114 A1 | 12/2014 |

OTHER PUBLICATIONS

PCT/KR2018/002945. International Search Report & Written Opinion (dated Jan. 10, 2019). 19 pages.

*Primary Examiner* — Tri M Tran
(74) *Attorney, Agent, or Firm* — Loza & Loza, LLP; Heidi Eisenhut (57) ABSTRACT

A cluster visualization apparatus is disclosed. A cluster visualization apparatus according to the present disclosure includes a state detector configured to obtain state information of a cluster configured with a plurality of boxes, a display, and a controller configured to display a three-dimensional model image configured with a plurality of layers corresponding to a plurality of network layers and to display an image corresponding to each of the plurality of boxes over at least one layer of the plurality of layers, based on the state information.

16 Claims, 6 Drawing Sheets

(51) Int. Cl.
    *G06F 9/455*       (2018.01)
    *G06T 17/10*       (2006.01)
    *H04L 67/75*       (2022.01)

(52) U.S. Cl.
    CPC .... *H04L 67/75* (2022.05); *G06F 2009/45587* (2013.01); *G06F 2009/45591* (2013.01); *G06F 2009/45595* (2013.01)

(58) Field of Classification Search
    CPC ....... G06F 9/45558; G06F 2009/45587; H04L 67/36; H04L 67/10; G06T 11/206; G06T 17/10; G06K 9/6219
    See application file for complete search history.

(56) References Cited

U.S. PATENT DOCUMENTS

2017/0070594 A1    9/2017    Oetting et al.
2017/0277173 A1*  9/2017    Bonomi ........... G06Q 10/06315

* cited by examiner

CLUSTER VISUALIZATION DEVICE

TECHNICAL FIELD

The present disclosure relates to a cluster visualization apparatus for indicating state information of boxes constituting the cluster in a three-dimensional model.

BACKGROUND ART

Cloud infrastructure has an advantage of reducing IT costs of users and improving agility and efficiency of resource operations, and thus various cloud services are in operation.

Recently, with the popularity of the cloud infrastructure, there is an increasing number of cases in which clusters are formed by using multiple boxes and used in cluster units. In addition, there is an increasing number of cases in which a plurality of logical boxes are configured and used for efficient use of cluster resources.

Meanwhile, in the related art, a cluster including a plurality of boxes is expressed by a two-dimensional visualization method such as a two-dimensional graph, a two-dimensional tree, and a circle. However, as the utilization of a multi-box cluster configured with a plurality of boxes has recently increased, such a two-dimensional visualization method has a limitation in clearly expressing the multi-box cluster.

In addition, the prior art mainly utilizes a method of visualizing on a network layer basis in order to express an overlay form of the network. However, while the complex structure of clusters recently increase, since boxes, networks, applications, services, and the like of clusters can have characteristic that is associated with several network layers instead of being divided into specific network layers, in the existing hierarchical visualization method, there is a limitation in that the expression of a feature associated with a plurality of network layers is insufficient or is expressed incorrectly.

In addition, recently, in a situation where an increasing frequency of use of the container, the necessity of visualizing logical boxes including not only virtual machines (VMs) but also containers has emerged.

DISCLOSURE

Technical Problem

The present disclosure has been made to solve the above-described problem, and an object of the present disclosure relates to a cluster visualization apparatus for indicating state information of boxes configuring a cluster in a three-dimensional model.

Technical Solution

A cluster visualization apparatus according to an embodiment of the present disclosure includes a state detector configured to obtain state information of a cluster configured with a plurality of boxes, a display, and a controller configured to display a three-dimensional model image configured with a plurality of layers corresponding to a plurality of network layers and to display an image corresponding to each of the plurality of boxes over at least one layer of the plurality of layers, based on the state information.

In this case, the image corresponding to each of the plurality of boxes may pass through a layer corresponding to a network layer with which each of the plurality of boxes is associated.

Meanwhile, the plurality of boxes may include a physical box and a logical box, and the logical box may include at least one of a virtual machine and a container.

Meanwhile, the three-dimensional model image may be a truncated cone.

Meanwhile, the image corresponding to each of the plurality of boxes may be a three-dimensional image, and the area or diameter of the cross-section of the three-dimensional image may correspond to a size of a resource of each of the plurality of boxes.

Meanwhile, the controller may display information on a use of the plurality of boxes on the three-dimensional model image.

Meanwhile, the controller may display an image corresponding to a first layer of the plurality of layers, the first layer may correspond to a first network layer of the plurality of network layers, the image corresponding to the first layer may include at least one of a UI indicating one or more boxes associated with the first network layer, a use of the one or more boxes, network connection information of the one or more boxes, and information on a firewall of the first network layer and information on a connection point of the first network layer.

Meanwhile, the controller may display an image corresponding to a first layer of the plurality of layers and displays security levels of one or more boxes associated with a first network layer in a contour line on the image corresponding to the first layer. Here, the first layer may correspond to the first network layer of the plurality of network layers.

Meanwhile, a method for operating a cluster visualization apparatus according to an embodiment of the present disclosure includes obtaining state information of a cluster configured with a plurality of boxes, displaying a three-dimensional model image configured with a plurality of layers corresponding to a plurality of network layers, based on the state information, and displaying an image corresponding to each of the plurality of boxes over at least one layer of the plurality of layers.

In this case, the image corresponding to each of the plurality of boxes may pass through a layer corresponding to a network layer with which each of the plurality of boxes is associated.

Meanwhile, the plurality of boxes may include a physical box and a logical box, and the logical box may include at least one of a virtual machine and a container.

Meanwhile, the three-dimensional model image may be a truncated cone.

Meanwhile, the image corresponding to each of the plurality of boxes may be a three-dimensional image, and the area or diameter of the cross-section of the three-dimensional image may correspond to a size of a resource of each of the plurality of boxes.

Meanwhile, the method for operating a cluster visualization apparatus according to an embodiment of the present disclosure may further include displaying information on a use of the plurality of boxes on the three-dimensional model image.

Meanwhile, the method for operating a cluster visualization apparatus according to an embodiment of the present disclosure may further include displaying an image corresponding to a first layer of the plurality of layers, the first layer may correspond to a first network layer of the plurality of network layers, and the image corresponding to the first layer may include at least one of a UI indicating one or more boxes associated with the first network layer, a use of the one or more boxes, network connection information of the one or more boxes, and information on a firewall of the first network layer and information on a connection point of the first network layer.

Meanwhile, the method for operating a cluster visualization apparatus according to an embodiment of the present disclosure may further include displaying an image corresponding to a first layer of the plurality of layers, and displaying the security level of one or more box associated with a first network layer in a contour line on the image corresponding to the first layer, and the first layer may correspond to the first network layer of the plurality of network layers.

Advantageous Effect

The present disclosure has an advantage of being capable of clearly expressing the relationship between the box and the network layer by using a three-dimensional model. In particular, in a cluster environment where a plurality of network layers are overlaid, there is an advantage of being capable of clearly expressing a box operating in association with a plurality of network layers.

BEST MODE

Hereinafter, embodiments of the present disclosure will be described in detail with reference to the accompanying drawings, and the same or similar components will be given the same reference numerals regardless of the reference numerals, and redundant description thereof will be omitted. The suffixes "module" and "unit" for components used in the following description are given or used interchangeably in consideration of ease of specification and do not have distinct meanings or roles from each other. In addition, in describing the embodiments disclosed herein, if it is determined that the detailed description of the related known technology may obscure the gist of the embodiments disclosed herein, the detailed description thereof will be omitted. In addition, it should be understood that the accompanying drawings are intended to facilitate understanding of the embodiments disclosed herein, but the technical spirit disclosed herein is not limited by the accompanying drawings and includes all changes, equivalents, and substitutes included in the spirit and scope of the present invention.

Terms including ordinal numbers such as first and second may be used to describe various components, but the components are not limited by the terms. These terms are used only to distinguish one component from other components.

When a component is referred to as being "connected" or "accessed" to another component, it may be directly connected to or accessed to that other component, but it should be understood that other components may be present in between. On the other hand, if a component is referred to be "directly connected" or "directly accessed" to another component, it should be understood that there is no other component in between.

Singular expressions include plural expressions unless the context clearly indicates otherwise. In this application, it should be understood that the terms "comprises" or "having" are intended to indicate that there is a feature, number, step, operation, component, part, or combination thereof described in the specification and the possibility of the presence or the addition of one or more other features, numbers, steps, operations, components, parts, or combinations thereof is not excluded.

Figure 1A:
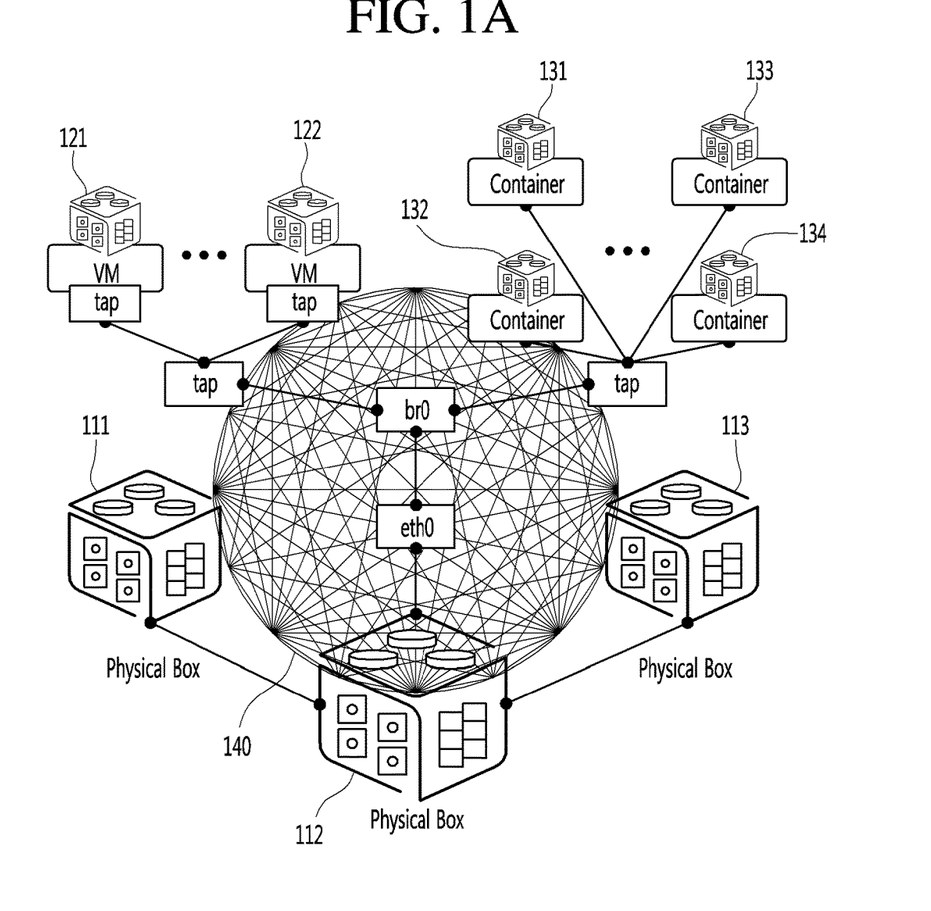
FIG. 1a is a view illustrating a cluster according to an embodiment of the present disclosure.

FIG. 1a is a view illustrating a cluster according to an embodiment of the present disclosure.

A plurality of boxes 111, 112, 113, 121, 122, 131, 132, 133, and 134 may constitute one cluster 100.

Here, the plurality of boxes 111, 112, 113, 121, 122, 131, 132, 133, and 134 may include one or more physical boxes 111, 112, and 113 and one or more logical boxes 121, 122, 131, 132, 133, and 134.

Here, one or more physical boxes 111, 112, and 113 may mean actual equipment, that is, hardware and one or more physical boxes 111, 112, and 113 may constitute a cluster 100.

The physical boxes 111, 112, and 113 may be connected to other boxes by L2-based networks, L3-based networks, or various other communication means, according to the intended use.

Meanwhile, the security levels of the physical boxes 111, 112, and 113 may be different from each other.

One physical box can support one or more logical box. FIG. 1a illustrates logical boxes 121, 122, 131, 132, 133, and 134 supported by one or more physical boxes 111, 112, and 113.

One or more logical boxes 121, 122, 131, 132, 133, and 134 may include virtual machines (VMs) and containers and can be connected to other boxes by L2-based networks, L3-based networks, or various other communication means, according to on the intended use.

Meanwhile, the security levels of the logical boxes 121, 122, 131, 132, 133, and 134 may be different from each other.

Figure 1B:
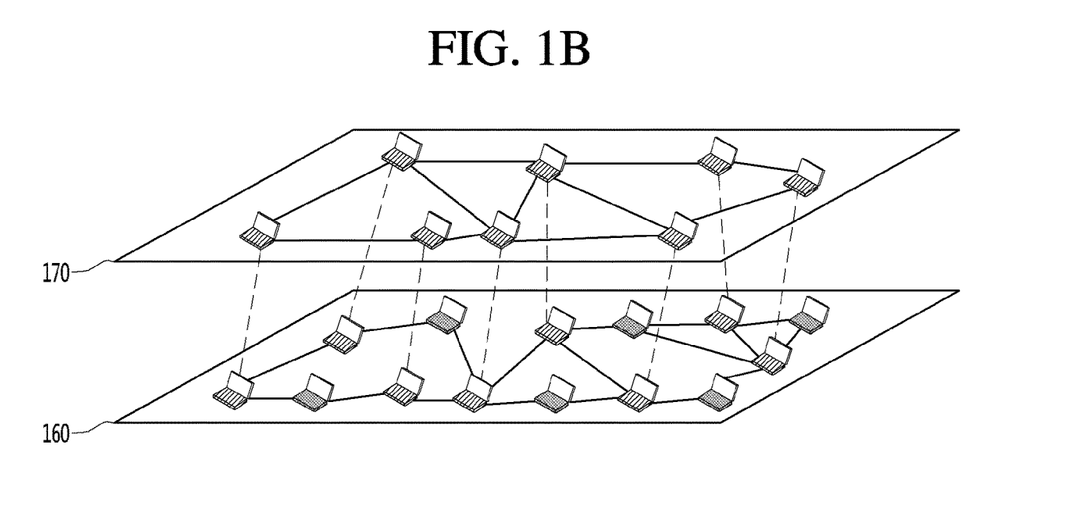
FIG. 1b is a view for explaining a hierarchical structure of a network.

FIG. 1b is a view for explaining a hierarchical structure of a network.

According to FIG. 1b, the network may be configured with a physical network and one or more overlay networks.

Here, the physical network 160 is a network formed by a connection between actual physical systems and may constitute a first network layer of the network layers.

One or more overlay networks may be virtual networks established over the physical network 160.

In FIG. 1b, only one overlay network 170 is illustrated for convenience of description, but a plurality of overlay networks may be configured, and the number thereof may be different according to how the network environment is configured.

Each overlay network may constitute one network layer. For example, if the overlay is performed in three stages, the physical network 160 may constitute a first network layer, a first overlay network may constitute a second network layer, a second overlay network may constitute a third network layer, and a third overlay network may constitute a fourth network layer.

Figure 2:
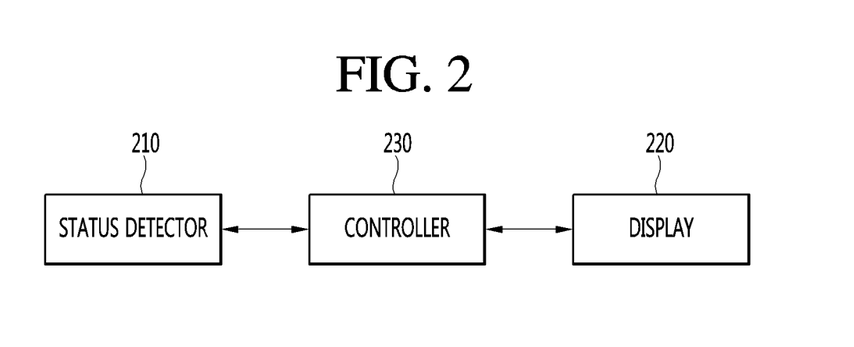
FIG. 2 is a block diagram illustrating a configuration of a cluster visualization apparatus in a cloud environment according to an embodiment of the present disclosure.

FIG. 2 is a block diagram illustrating a configuration of a cluster visualization apparatus in a cloud environment according to an embodiment of the present disclosure.

The cluster visualization apparatus 200 may include a state detecting unit 210, a display unit 220, and a control unit 230.

The state detecting unit 210 may monitor a cluster system and obtain state information of the cluster.

In more detail, the state detecting unit 210 may obtain information on a type, a resource size, a use, a networking connection state, a security state, a security level, and the like of the boxes constituting the cluster.

In addition, the state detecting unit 210 may obtain information on a firewall applied to the cluster, a connection point allowed according to a firewall rule, a monitoring point, a connection relationship between an external component and the cluster, a network layer, and the like.

The display unit 220 may display an image.

The control unit 230 may generate a UI based on the state information and display the generated UI on the display unit 220 to visualize and provide the state information of the cluster. In this case, the control unit 230 may visualize and provide the state information of the cluster in a three-dimensional form.

In detail, the control unit 230 may display a three-dimensional model image configured with a plurality of layers corresponding to the plurality of network layers, in order to display the state information of the cluster.

In addition, the control unit 230 may display an image corresponding to each of the plurality of boxes over at least one layer of the plurality of layers.

Figure 3:
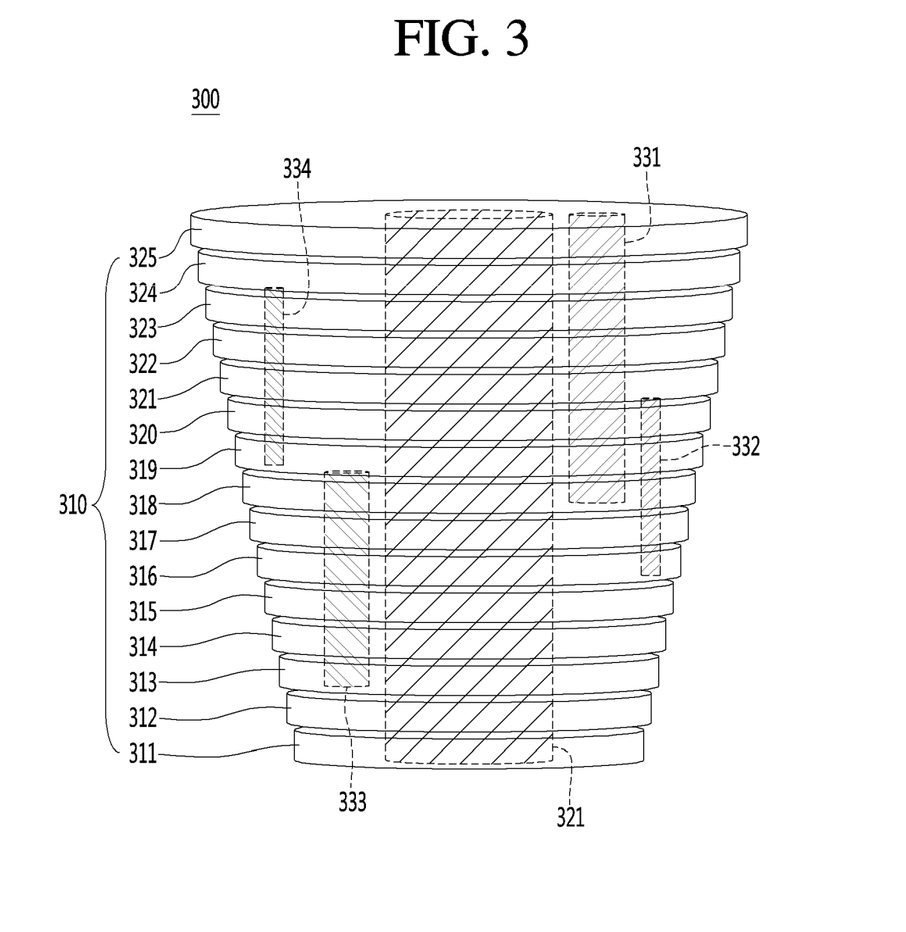
FIG. 3 is a diagram illustrating a three-dimensional visualized image of cluster state information according to an embodiment of the present disclosure.

FIG. 3 is a diagram illustrating a three-dimensional visualized image 300 of cluster state information according to an embodiment of the present disclosure.

The control unit 230 can display the three-dimensional model image 310 configured with the plurality of layers 311, 312, 313, 314, 315, 316, 317, 318, 319, 320, 321, 322, 323, 324, and 325.

Here, the plurality of layers 311, 312, 313, 314, 315, 316, 317, 318, 319, 320, 321, 322, 323, 324, and 325 may correspond to a plurality of network layers.

For example, a first layer 311 may represent the first network layer on the network, that is, a physical network. For another example, a second layer 312 can represent the second network layer on the network, that is, the first overlay network. As another example, a fifteenth layer 325 may represent a fifteenth network layer on the network, that is, a fourteenth overlay network.

The number of overlay networks may vary according to how the network environment is configured. Since one layer represents one network layer, the user may grasp the degree of an overlay of the physical network according to the height of the three-dimensional model image 310. For example, if the number of layers is 15, the user may check that the physical network has proceeded to the overlay of 14 stages.

Meanwhile, in FIG. 3, the network layer and the layer have been described as having a 1:1 correspondence, but the present disclosure is not limited thereto, and one network layer may be expressed by a plurality of layers or a plurality of network layers may be expressed by one layer.

In addition, in FIG. 3, although it is described that a plurality of layers 311, 312, 313, 314, 315, 316, 317, 318, 319, 320, 321, 322, 323, 324, and 325 are stacked to form a three-dimensional model image 310, the present disclosure is not limited thereto, and only the height of the three-dimensional model image 310 may represent a progress stage of the overlay.

Meanwhile, the three-dimensional model image 310 of the network layer may be a truncated cone.

In this case, the cross-section of each of the plurality of layers 311, 312, 313, 314, 315, 316, 317, 318, 319, 320, 321, 322, 323, 324, and 325 may be in a form of a circle and the center of cross-section of each of the plurality of layers 311, 312, 313, 314, 315, 316, 317, 318, 319, 320, 321, 322, 323, 324, and 325 may be the same.

In addition, the cross-sectional area of the plurality of layers may increase toward the upper layer so as to be capable of expressing from the lower physical box to the upper application. In more detail, since the cross-sectional area of the plurality of layers is associated with the physical resource toward the lower layer and the cross-sectional area of the plurality of layers is associated with the virtual resource while the hardware dependencies become weak toward the upper layer, the cross-sectional area of the plurality of layers may increase toward the upper layer.

Meanwhile, although FIG. 3 illustrates that the three-dimensional model image of the network layer is a truncated cone, the present disclosure is not limited thereto. For example, the three-dimensional model image may be in a form of a cylinder or may be in a form of a polygonal pillar. In addition, the cross-sections of the plurality of layers need not be the same. In other words, it is sufficient if the three-dimensional model image of the network layer is a three-dimensional image having a horizontal, vertical, and height components.

Meanwhile, the control unit 230 may display a plurality of images 321, 331, 332, 333, and 334 corresponding to each of the plurality of boxes together with the three-dimensional model image 310.

In detail, the control unit 230 may display an image 321 corresponding to a physical box in the three-dimensional model image 310.

Here, the image 321 corresponding to the physical box may represent one or more physical boxes 111, 112, and 113 constituting the cluster 100.

In addition, the control unit 230 may display a plurality of images 331, 332, 333, and 334 corresponding to logical boxes, respectively, in the three-dimensional model image 310.

Here, the plurality of images 331, 332, 333, and 334 respectively corresponding to the plurality of logical boxes may indicate logical boxes.

For example, the first image 331 may indicate a first container constituting the cluster 100, the second image 332 may indicate a first virtual machine constituting the cluster 100, the third image 333 may indicate a second virtual machine constituting the cluster 100, and the fourth image 334 may indicate a third virtual machine constituting the cluster 100.

The plurality of images 321, 331, 332, 333, and 334 respectively corresponding to the plurality of boxes may be three-dimensional images. In this case, on the cross-section, the image 321 corresponding to the physical box may be located at the center of the three-dimensional model image 310. In addition, the images 331, 332, 333, and 334 respectively corresponding to the plurality of logical boxes may be displayed in a region other than the region in which the image 321 corresponding to the physical box is displayed on the cross-section.

Meanwhile, the cross-sectional area of the plurality of images 321, 331, 332, 333, and 334 respectively corresponding to the plurality of boxes may correspond to the size of a resource of each of the plurality of boxes.

For example, if the resource of the first container is larger than the resource of the first virtual machine, the cross-sectional area of the first image 331 corresponding to the first container may be larger than the cross-sectional area of the second image 332 corresponding to the first virtual machine.

In another example, if the resource of the second virtual machine is larger than the resource of the third virtual machine, the cross-sectional area of the third image 333 corresponding to the second virtual machine may be larger than the cross-sectional area of the fourth image 334 corresponding to the third virtual machine.

If the plurality of images 321, 331, 332, 333, and 334 respectively corresponding to the plurality of boxes are three-dimensional images, the plurality of images 321, 331, 332, 333 and 334 corresponding to each of the plurality of boxes may be a cylinder.

In this case, the plurality of images 321, 331, 332, 333, and 334 respectively corresponding to the plurality of boxes may be displayed so as to pass through at least one of the plurality of layers 311, 312, 313, 314, 315, 316, 317, 318, 319, 320, 321, 322, 323, 324, and 325. In other words, the height direction of the cylinder corresponding to each of the plurality of boxes may be a direction vertically passing through the plurality of layers.

Meanwhile, if the plurality of images 321, 331, 332, 333, and 334 respectively corresponding to the plurality of boxes is a cylinder, the diameter of the cylinder corresponding to each of the plurality of boxes may correspond to the size of each resource of the plurality of boxes.

For example, since the resource of the physical box is larger than the resource of the first container, the diameter of the image 321 corresponding to the physical box may be larger than the diameter of the first image 331 corresponding to the first container.

Meanwhile, in FIG. 3, although a plurality of images 321, 331, 332, 333, and 334 respectively corresponding to the plurality of boxes are illustrated as cylinders, the present disclosure is not limited thereto. For example, the plurality of images 321, 331, 332, 333, and 334 respectively corresponding to the plurality of boxes may be polygonal pillars or three-dimensional images having a non-uniform cross-section.

In addition, in FIG. 3, if the plurality of images 321, 331, 332, 333, and 334 respectively corresponding to the plurality of boxes are cylinders, the height direction of the cylinders is illustrated as a direction vertically passing through the plurality of layers, but the height direction of the cylinders is not limited thereto. In other words, It is sufficient if a three-dimensional image having a circular pillar, a polygonal pillar, or a three-dimensional image having a non-uniform cross-section passes through at least one of a plurality of layers 311, 312, 313, 314, 315, 316, 317, 318, 319, 320, 321, 322, 323, 324, and 325.

In addition, the cross-sectional area (or the diameter of the cylinder) of the three-dimensional image previously is described as indicating the size of the resource of the box, but it is not limited thereto. For example, the volume of the three-dimensional image may correspond to the size of the resource of the box.

In addition, in FIG. 3, the plurality of images 321, 331, 332, 333, and 334 respectively corresponding to the plurality of boxes are illustrated as being three-dimensional images, but are not limited thereto. For example, the images 321, 331, 332, 333, and 334 respectively corresponding to the plurality of boxes may be a rectangle or a line passing through at least one of the plurality of layers 311, 312, 313, 314, 315, 316, 317, 318, 319, 320, 321, 322, 323, 324, and 325.

Meanwhile, the plurality of boxes may provide a plurality of services or a plurality of applications. In more detail, one service or one application may be provided by a plurality of boxes. In addition, one box may provide a plurality of services or a plurality of applications.

Meanwhile, a service or application may be provided over a plurality of network layers in association with a plurality of network layers. Thus, a plurality of boxes can also be associated with a plurality of network layers.

In this case, the plurality of images 321, 331, 332, 333, and 334 respectively corresponding to the plurality of boxes may be displayed so as to pass through the layers corresponding to the network layer with which each of the plurality of boxes is associated.

For example, if the first container is providing the first service and the first service is associated with the eighth network layer to the fifteenth network layer, the first image 331 corresponding to the first container may be displayed so as to pass through the eighth layer 318 to the fifteenth layer 325.

For another example, if the first virtual machine is providing a second service and a third service, the second service is associated with the sixteenth network layer to the eighteenth network layer, and the third service is associated with the seventeenth network layer to the twentieth network layer, the second image 332 corresponding to the virtual machine may be displayed so as to pass through the sixteenth layer 316 to the twentieth layer 320.

For another example, since the physical box is associated with all network layers, the image 321 corresponding to the physical box may be displayed so as to pass through the first layer 311 to the fifteenth layer 325.

Thus, the present disclosure has an advantage of clearly expressing the relationship between the box and the network layer by using a three-dimensional model. In particular, in a cluster environment where a plurality of network layers are overlaid, there is an advantage of clearly expressing a box operating in association with a plurality of network layers.

Meanwhile, the plurality of images 321, 331, 332, 333, and 334 respectively corresponding to the plurality of boxes may include information on a use of the box, that is, information on a service or an application provided by the box.

According to an embodiment, the control unit 230 can display the plurality of images 321, 331, 332, 333, and 334 corresponding to the plurality of boxes, respectively, in color corresponding to a use of each of the plurality of boxes. For example, if the first box provides the first service and the second box and the third box provide the first application, the first box may be displayed in red and the second box and the third box may be displayed in yellow.

According to another example, the control unit 230 can display text indicating a use of each of the plurality of boxes together with the plurality of images 321, 331, 332, 333, and 334 respectively corresponding to the plurality of boxes.

Also, in the cross-section, boxes with the same use can be displayed at a close distance to each other, and boxes with the different use can be displayed at a far distance from each other.

Accordingly, the present disclosure can clearly express an application or a service provided in association with a plurality of network layers in a cluster environment where a plurality of network layers are overlaid. In addition, as the size of the resource of the box providing the application or service is expressed on the three-dimensional visualization model, there is an advantage that the size of the resource used to provide a specific application or service can be expressed.

In addition, the present disclosure has an advantage that can be expressed by visualizing the container in a situation where the frequency of utilization of the container is increasing recently.

Figure 4:
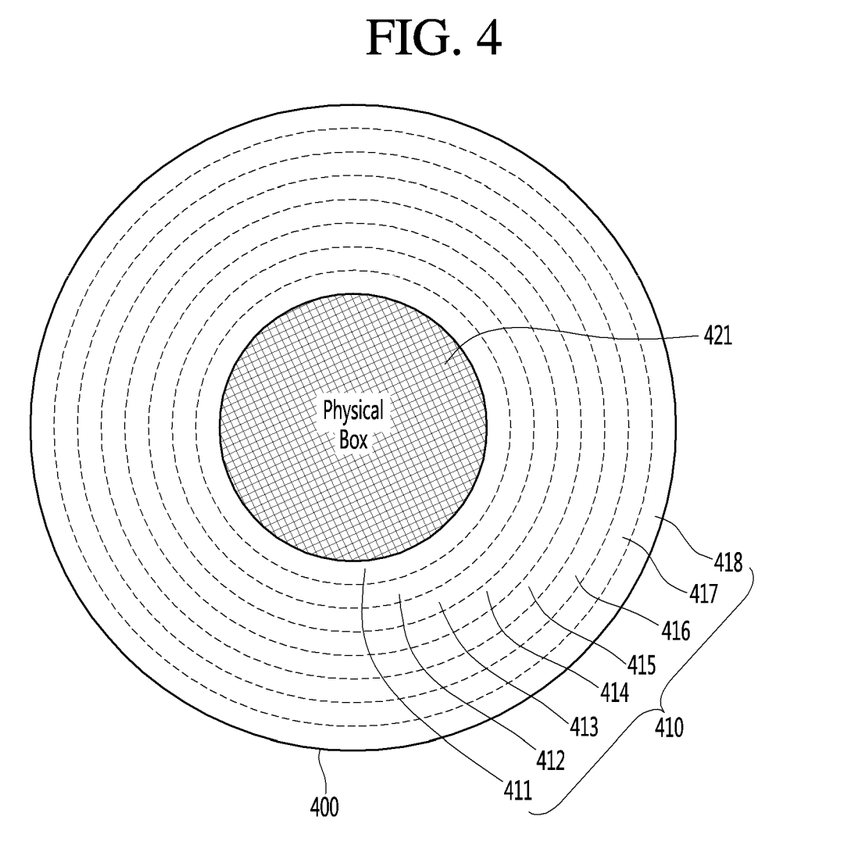
FIGS. 4 to 5 are views for describing a method for displaying a three-dimensional visualized image of cluster state information according to an embodiment of the present disclosure.
Figure 5:
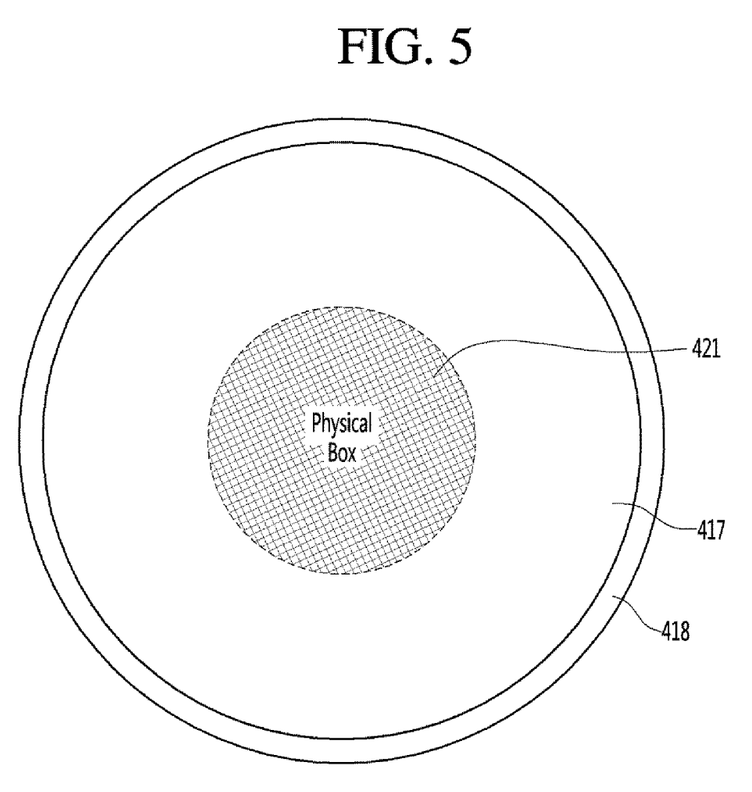

FIGS. 4 to 5 are views for describing a method for displaying a three-dimensional visualized image of cluster state information according to an embodiment of the present disclosure.

The three-dimensional visualized image of the cluster state information may be displayed by being moved or rotated.

Specifically, based on the user input, the control unit 230 may move and display the three-dimensional visualized image of the cluster state information, or rotate left, right, up, down, or diagonally and display.

FIG. 4 illustrates the three-dimensional visualized image viewed from above as the three-dimensional visualized image 400 of the state information of the cluster rotates.

Here, the cluster is in a state of being configured with eight network layers. Accordingly, eight layers 411, 412, 413, 414, 415, 416, 417, and 418 corresponding to the eight network layers, respectively, may be displayed.

In addition, if eight layers constitute a truncated cone shape when the three-dimensional visualized image 400 is viewed from above, as illustrated in FIG. 4, the eight layers form concentric circles.

In addition, the image 421 corresponding to the physical box is a cylinder, and the cylinder is embedded vertically in eight layers 411, 412, 413, 414, 415, 416, 417, and 418 on the three-dimensional visualized image. Therefore, when the three-dimensional visualized image 400 is viewed from above, the image 421 corresponding to the physical box may be displayed as a circle.

Meanwhile, in FIG. 4, only the physical box 421 is illustrated for convenience of description, but an image corresponding to the logical box may also be displayed.

The image corresponding to the logical box is also a cylinder, and the cylinder on the three-dimensional visualized image is embedded vertically in at least one of eight layers 411, 412, 413, 414, 415, 416, 417, and 418. Therefore, when the 3D visualized image 400 is viewed from above, an image corresponding to a logical box may be displayed as a circle.

Images respectively corresponding to the plurality of boxes may be widely distributed on the layer. Therefore, according to the present disclosure, by moving or rotating the three-dimensional visualized image 400, it is easy to check the boxes widely distributed on the layer.

In addition, according to the present disclosure, by allowing the three-dimensional visualized image 400 to be viewed from above, there is an advantage that can easily check the boxes constituting the cluster, services or applications provided by the cluster, and the size of resources.

FIG. 5 is a view for describing selection of a specific layer of a plurality of layers.

When an input for selecting a specific layer of a plurality of layers constituting the three-dimensional visualized image 400 is received, the control unit 230 may display a cross-sectional view of the specific layer.

For example, when a user input for selecting the seventh layer 417 from the plurality of layers 411, 412, 413, 414, 415, 416, 417, and 418 illustrated in FIG. 4 is received, as illustrated in FIG. 5, the control unit 230 may display a cross-sectional view of the seventh layer 417.

Information included in the cross-sectional view of a specific layer will be described in detail with reference to FIG. 6.

Figure 6:
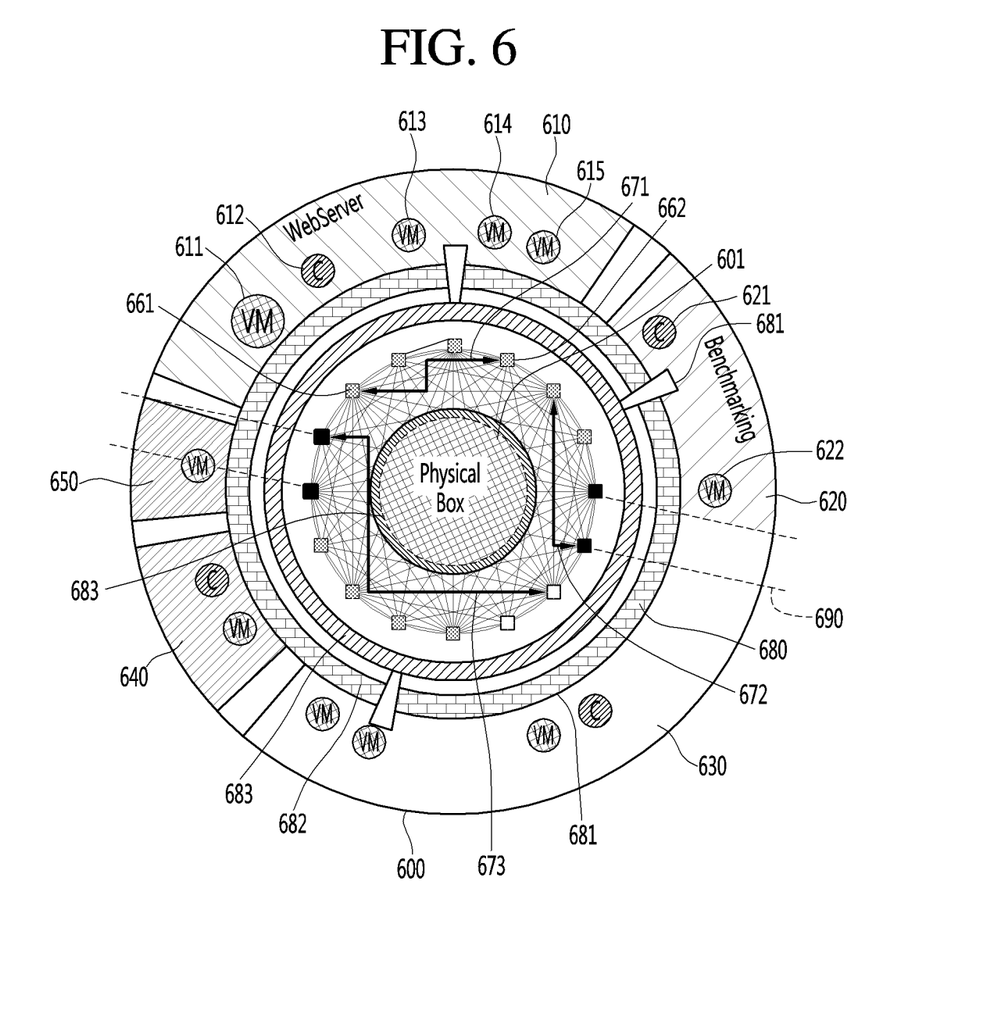
FIG. 6 is a view for describing information included in an image corresponding to a specific layer, according to an embodiment of the present disclosure.

FIG. 6 is a view for describing information included in an image corresponding to a specific layer, according to an embodiment of the present disclosure. In the following description, it is assumed that a specific layer is a third layer. In addition, the third layer will be described as corresponding to the third network layer on the network.

An image corresponding to the third layer may include information on at least one of a UI indicating one or more boxes associated with the third network layer, a use of the one or more boxes, a type of the one or more boxes, a size of a resource of the one or more boxes, the networking connection information of the one or more boxes, the firewall of the third network layer, and the connection point of the third network layer.

The control unit 230 may display an image 600 corresponding to the third layer. Here, the image 600 corresponding to the third layer may be a cross-sectional view illustrating a cross-section of the third layer of the plurality of layers of the three-dimensional visualized image 300 described with reference to FIG. 3.

The control unit 230 may display the UIs 601, 611, 612, 613, 614, 615, 621, and 622 indicating one or more boxes associated with the third network layer on the image 600 corresponding to the third layer.

In detail, in FIG. 3, an image corresponding to a box has been described as being displayed over a layer associated with itself in the three-dimensional visualized image 300. Therefore, in the cross-sectional view of the third layer, the cross-section of the three-dimensional image passing through the third layer in the three-dimensional visualized image 300 may be displayed.

In other words, the UIs indicating one or more boxes associated with the third network layer may be cross-sections of the three-dimensional image passing through the third layer in the three-dimensional visualized image 300.

For example, if 30 boxes constitute a cluster, and 15 boxes of the 30 boxes operate in association with the third layer, 15 UIs corresponding to the 15 boxes respectively may be displayed in the cross-sectional view of the third layer.

As described above, according to the present disclosure, there is an advantage that the user can easily grasp which box operates over a specific network layer.

Meanwhile, the image 600 corresponding to the third layer may be a circle, and the UI 601 corresponding to the physical box may be a circle. In addition, the center of the UI 601 corresponding to the physical box and the center of the image 600 corresponding to the third layer may be the same, and the diameter of the UI 601 corresponding to the physical box may be smaller than the diameter of the image 600 corresponding to the third layer.

Meanwhile, the control unit 230 may display a use of one or more boxes associated with the third layer. Here, the use may mean a service or an application provided by using a resource of a box. For example, the use may include Web Server, API Server, Visibility Center, and the like.

In detail, meanwhile, the image 600 corresponding to the third layer may be divided into an inner region and an outer region by the concentric circles 681. In addition, the outer region of the concentric circles 681 may be divided into a plurality of regions 610, 620, 630, 640, and 650 by lines extending radially from the concentric circles 681.

Here, the plurality of regions 610, 620, 630, 640, and 650 may correspond to services or applications provided in association with the third network layer, respectively.

For example, if the service or application provided in association with the third network layer of the services or applications provided in the cluster is the first service to the fifth service, the outer region of the concentric circle 681 may include five regions 610, 620, 630, 640, and 650. In addition, the first region 610 may indicate the first service, the second region 620 may indicate the second service, the third region 630 may indicate the third service, the fourth region 640 may represent the fourth service, and the fifth region 650 may indicate the fifth service, respectively.

Meanwhile, the UIs 601, 611, 612, 613, 614, 615, 621, and 622 indicating one or more boxes associated with the third network layer may be displayed by dividing into their display positions according to the use of the boxes.

For example, if the use of the first box, second box, third box, fourth box, and fifth box of the boxes associated with the third network layer is the first service, the UI 611 corresponding to the first box, the UI 612 corresponding to the second box, the UI 613 corresponding to the third box, the UI 614 corresponding to the fourth box, and the UI 615 corresponding to the fifth box may be displayed on the first region 610 indicating the first service.

For another example, if the use of the sixth box and the seventh box of the boxes associated with the third network layer is the second service, the UI 621 corresponding to the sixth box and the UI 622 corresponding to the seventh box may be displayed on the second region 620 indicating the second service.

As described above, according to the present disclosure, the user can easily grasp which service or app is provided in association with a specific network layer and can easily grasp which box is used for what use.

Meanwhile, the control unit 630 may display information on one or more types of boxes associated with the third network layer on the image 600 corresponding to the third layer.

In detail, the plurality of types of boxes may be divided into bare metal, virtual machines (VMs), and containers, and the control unit 630 can display a UI indicating a box associated with a third network layer in different colors according to on the type of the box.

For example, if a first UI 611 corresponding to the first box, a third UI 613 corresponding to the third box, a fourth UI 614 corresponding to the fourth box, and a fifth UI 615 corresponding to the fifth box are first types (virtual machines) and the second UI 612 corresponding to the second box is a second type (container), the control unit 230 can display the first UI 611, the third UI 613, the fourth UI 614, and the fifth UI 615 in a first color and can display the second UI 612 in a second color. In addition, the control unit 230 can display text indicating the first type (virtual machine) on the first UI 611, the third UI 613, the fourth UI 614, and the fifth UI 615 and can display text indicating the second type (container) on the second UI 612.

In the above description, the type of the box has been described as being indicated by color but is not limited thereto. For example, the UI indicating the first type of box may be displayed in a circle, and the UI indicating the second type of box may be displayed in a rectangle. In other words, the type of the box may be displayed as a form of a UI.

Meanwhile, the on and off states of the box may also be displayed as colors. For example, the second UI 612 may be displayed in the second color if the second box is in the on state, and the second UI 612 may be displayed in the third color if the second box is in the off state. In addition, the first UI 611 may be displayed in a first color if the first box is in the on state, and the first UI 611 may be displayed in the third color if the first box is in the off state.

Meanwhile, the control unit 230 may display information on resource sizes of one or more boxes associated with the third network layer on the image 600 corresponding to the third layer.

In detail, the diameters of the UIs 611, 612, 613, 614, 615, 621, and 622 indicating boxes associated with the third network layer may correspond to the size of resources provided by each box at the third network layer.

For example, if the resource provided by the first box at the third network layer is larger than the resource provided by the second box at the third network layer, the diameter of the UI 611 indicating the first box may be larger than the diameter of the UI 612 indicating the second box.

For another example, if the resource provided by the first box at the third network layer is greater than the resource provided by the second box at the third network layer, the cross-sectional area of the UI 611 indicating the first box may be larger than the cross-sectional area of the UI 612 indicating the second box.

As described above, according to the present disclosure, the user can easily grasp the type of the box and the size of the resource operating in association with the specific network layer.

Meanwhile, not only the size of the resource provided by the box but also the size of the resource provided to the service or the application in a specific network layer may be expressed. For example, sizes of the plurality of regions 610, 620, 630, 640, and 650 may correspond to sizes of resources supported by a corresponding service or application.

Meanwhile, the control unit 230 may display network connection information of at least one box in the third network layer on the image 600 corresponding to the third layer.

In more detail, each box associated with the third network layer includes one or more network interfaces and may be connected to another box through the network interface.

In this case, the control unit 230 may display UIs 661 and 662 respectively corresponding to the network interface.

In addition, the control unit 230 may display the connection lines 671, 672, and 673 connecting the UIs 661 and 662 corresponding to the network interface, thereby being capable of displaying network connection information of the boxes.

In this case, the connection lines 671, 672, and 673 may indicate the type and performance of the network. For example, a connection line indicating an L2-based network may be displayed in a first color, and a connection line indicating an L3-based network may be displayed in a second color. In addition, the thickness of the connection line may vary according to the bandwidth.

As described above, according to the present disclosure, the user can easily grasp the network connection relationship between the boxes, and the type and the performance of the network in the specific network layer.

Meanwhile, the control unit 230 may display information on the firewall in the third network layer.

In detail, the control unit 230 may display the UI 680 corresponding to the firewall in the third network layer. The image 600 corresponding to the third layer may be divided into an inner region and an outer region by the concentric circle 681, and the UI 680 corresponding to the firewall may be displayed on the inner region. In addition, the UI 680 corresponding to the firewall may be circular or annular and may be displayed so as to surround the UI 621 corresponding to the physical box.

Meanwhile, the control unit 230 may display information on the connection point. In detail, the control unit 230 may display the UI 681 corresponding to the connection point on the UI 680 corresponding to the firewall. Here, the connection point may mean a point through which the access is allowed through the firewall.

In addition, the control unit 230 may display a UI 682 indicating a monitoring point and a UI 683 indicating other security.

Thus, according to the present disclosure, the user can easily grasp the security state at a specific network layer.

Meanwhile, the control unit 230 may display a UI 690 indicating a connection relationship between the external component and the cluster.

As described above, the present disclosure has an advantage of being capable of providing not only state information of the entire cluster but also state information associated with a specific network layer by displaying an image corresponding to a specific network layer.

Meanwhile, the information displayed in two dimensions on the cross-sectional view of the three layers described in FIG. 6 may be displayed in three dimensions in the three-dimensional visualized image 300 described in FIG. 3.

For example, in FIG. 6, it is described that the first region 610 corresponding to the first service is displayed as a two-dimensional image.

In this case, the first service may be expressed as a pillar-shaped three-dimensional image having a first region 610 as a cross-section on the three-dimensional visualized image 300. In addition, the pillar-shaped three-dimensional image may pass through a layer corresponding to the network layer associated with the first service. In addition, the images of the plurality of boxes providing the first service may be displayed inside the three-dimensional image of the pillar shape.

Figure 7:
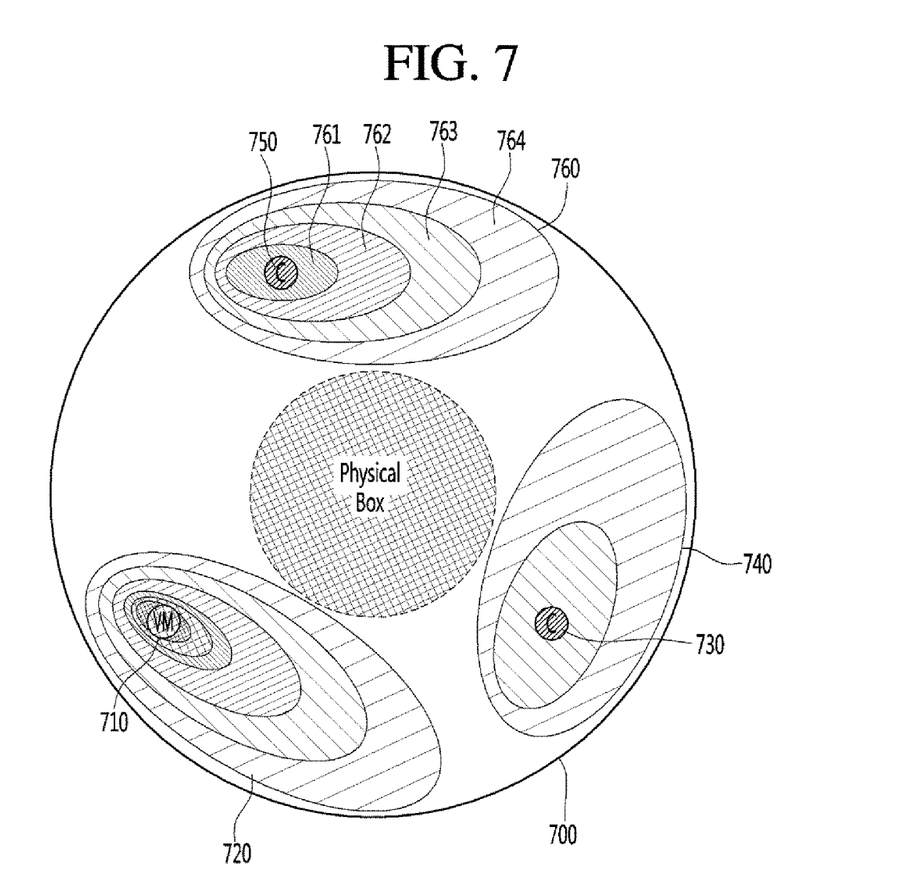
FIG. 7 is a view for describing a method for indicating a security state of a box according to an embodiment of the present disclosure.

FIG. 7 is a view for describing a method for indicating a security state of a box according to an embodiment of the present disclosure.

It is assumed that an image 700 corresponding to the seventh layer is currently displayed, and the seventh layer is a layer indicating the seventh network layer.

Security levels applied to one or more boxes 710, 730, and 740 associated with the seventh network layer may be different from each other.

In this case, the control unit 230 may obtain information on the security level of each of the one or more boxes 710, 730, and 740, according to whether anti-virus software, IPS/IDS, firewalls, or the like is applied.

In addition, the control unit 230 may display the security level of each of the one or more boxes 710, 730, and 740 as contour lines 720, 740, and 760 on the image 700 corresponding to the seventh layer.

For example, if the security level of the second box 730 is the lowest, the security level of the third box 750 is medium, and the security level of the first box 710 is the highest, the contour line 740 indicating the security level of the second box 730 can be displayed at the second-step height, the contour line 760 indicating the security level of the third box 750 can be displayed at the fourth-step height, and the contour line 720 indicating the security level of the first box 710 can be displayed at the sixth-step height.

The UI corresponding to each step in one contour line may be displayed in different colors from each other. For example, in the contour line 760 indicating the security level of the third box 750, the first-step contour line 764 may be displayed in green, the second-step contour line 763 may be displayed in light green, the third-step contour line 762 may be displayed in yellow, and the fourth-step contour line 761 may be displayed in orange.

Thus, the present disclosure can express different security levels for each box in a three-dimensional manner even in the two-dimensional plane, by introducing a contour line that can indicate the height.

Meanwhile, the control unit 230 is a configuration that generally controls the device, and may be used interchangeably with terms such as a central processing unit, a microprocessor, and a processor.

On the other hand, a method for operating the cluster visualization apparatus according to an embodiment of the present disclosure may include obtaining state information of the cluster configured with a plurality of boxes, displaying a three-dimensional model image configured with a plurality of layers corresponding to a plurality of network layers and displaying an image corresponding to each of the plurality of boxes over at least one of the plurality of layers, based on the state information, and displaying an image corresponding to a first layer of the plurality of layers.

The present disclosure described above can be embodied as computer-readable codes on a medium in which a program is recorded. The computer-readable medium includes all kinds of recording devices in which data that can be read by a computer system is stored. Examples of computer-readable media include hard disk drives (HDDs), solid state disks (SSDs), silicon disk drives (SDDs), ROM, RAM, CD-ROM, magnetic tapes, floppy disks, optical data storage devices, or the like. The foregoing detailed description should not be construed as limiting in all respects but should be considered as illustrative. The scope of the disclosure should be determined by reasonable interpretation of the appended claims, and all changes within the equivalent scope of the present disclosure are included in the scope of the present disclosure.

The invention claimed is:

1. A cluster visualization apparatus comprising:
   a state detector configured to obtain state information of a cluster configured with a plurality of boxes;
   a physical display; and
   a controller configured to display a three-dimensional model image configured with a plurality of overlaid layers corresponding to a plurality of network layers and to display an image corresponding to each of the plurality of boxes over at least one layer of the plurality of overlaid layers, based on the state information,
   wherein at least a layer of the plurality of overlaid layers has a horizontal, vertical, and height components.

2. The cluster visualization apparatus of claim 1, wherein the image corresponding to each of the plurality of boxes passes through a layer corresponding to a network layer with which each of the plurality of boxes is associated.

3. The cluster visualization apparatus of claim 1, wherein the plurality of boxes includes a physical box and a logical box, and wherein the logical box includes at least one of a virtual machine and a container.

4. The cluster visualization apparatus of claim 1, wherein the three-dimensional model image is a truncated cone.

5. The cluster visualization apparatus of claim 1, wherein the image corresponding to each of the plurality of boxes is a three-dimensional image and wherein at least one box of the plurality of boxes has a horizontal, vertical, and height components, and
wherein the area or diameter of the cross-section of the three-dimensional image corresponds to a size of a resource of each of the plurality of boxes.

6. The cluster visualization apparatus of claim 1, wherein the controller displays information on a use of the plurality of boxes on the three-dimensional model image.

7. The cluster visualization apparatus of claim 1, wherein the controller displays an image corresponding to a first layer of the plurality of overlaid layers,
wherein the first layer corresponds to a first network layer of the plurality of network layers,
wherein the image corresponding to the first layer includes at least one of a UI indicating one or more boxes associated with the first network layer, a use of the one or more boxes, network connection information of the one or more boxes, and information on a firewall of the first network layer and information on a connection point of the first network layer.

8. The cluster visualization apparatus of claim 1, wherein the controller displays an image corresponding to a first layer of the plurality of overlaid layers and displays security levels of one or more boxes associated with a first network layer in a contour line on the image corresponding to the first layer, and
wherein the first layer corresponds to the first network layer of the plurality of network layers.

9. A method for operating a cluster visualization apparatus comprising:
obtaining state information of a cluster configured with a plurality of boxes;
displaying a three-dimensional model image configured with a plurality of overlaid layers corresponding to a plurality of network layers, based on the state information; and
displaying an image corresponding to each of the plurality of boxes over at least one layer of the plurality of overlaid layers, based on the state information,
wherein at least a layer of the plurality of overlaid layers has a horizontal, vertical, and height components.

10. The method for operating a cluster visualization apparatus of claim 9,
wherein the image corresponding to each of the plurality of boxes passes through a layer corresponding to a network layer with which each of the plurality of boxes is associated.

11. The method for operating a cluster visualization apparatus of claim 9,
wherein the plurality of boxes includes a physical box and a logical box, and
wherein the logical box includes at least one of a virtual machine and a container.

12. The method for operating a cluster visualization apparatus of claim 9,
wherein the three-dimensional model image is a truncated cone.

13. The method for operating a cluster visualization apparatus of claim 9,
wherein the image corresponding to each of the plurality of boxes is a three-dimensional image and wherein at least one box of the plurality of boxes has a horizontal, vertical, and height components, and
wherein the area or diameter of the cross-section of the three-dimensional image corresponds to a size of a resource of each of the plurality of boxes.

14. The method for operating a cluster visualization apparatus of claim 9, further comprising:
displaying information on a use of the plurality of boxes on the three-dimensional model image.

15. The method for operating a cluster visualization apparatus of claim 9, further comprising:
display an image corresponding to a first layer of the plurality of overlaid layers;
wherein the first layer corresponds to a first network layer of the plurality of network layers, and
wherein the image corresponding to the first layer includes at least one of a UI indicating one or more boxes associated with the first network layer, a use of the one or more boxes, network connection information of the one or more boxes, and information on a firewall of the first network layer and information on a connection point of the first network layer.

16. The method for operating a cluster visualization apparatus of claim 9, further comprising:
displaying an image corresponding to a first layer of the plurality of overlaid layers; and
displaying the security level of one or more box associated with a first network layer in a contour line on the image corresponding to the first layer;
wherein the first layer corresponds to the first network layer of the plurality of network layers.

* * * * *